Patented Mar. 26, 1940

2,194,567

UNITED STATES PATENT OFFICE 2,194,567

ESTERS OF AMINOPYRIDINE CARBOXYLIC ACID AND PROCESSES FOR PRODUCING THE SAME

Raemer R. Renshaw, New York, and Paul F. Dreisbach, Yonkers, N. Y., assignors to Pyridium Corporation, Nepera Park, N. Y., a corporation of New York No Drawing. Application February 28, 1938, Serial No. 193,078

20 Claims. (Cl. 260—295)

Our invention relates to anesthetics of the pyridine series and the methods of preparing them.

It has been stated that the production of anesthesia is a property of the derivatives of the benzoyl group (Einhorn Liebieg's Annal, 1900, vol. 311; 1902, vol. 325; 1908, vol. 359). It is even stated that the benzoyl group could not be replaced by any other acid radicals (Filehne, Ber. klin. Woch. 1887, p. 107; Erhlich and Einhorn, Ber. 1894, p. 1870), and that the benzoyl group acted as an "anesthesiophore" group. Numerous local anesthetics have been made since the discovery of Einhorn, that the esters of p-aminobenzoic acid and hydroxybenzoic acid, and their various derivatives act more or less as anesthetics.

We have found, however, that derivatives other than those of the benzoyl group possess anesthetic properties and have produced derivatives of the pyridine ring which possess valuable anesthetic properties, some of which are less toxic than the analogous compounds of the benzene series.

The object of this invention is to prepare an anesthetic by esterification of a p-alkylaminopyridine carboxylic acids.

Another object of this invention is to prepare anesthetics of the pyridine series which are more effective than the corresponding compounds of the benzene series. Other objects of this invention can be seen from the specifications.

The amino group may be alkylated for our purpose by replacing one or both hydrogen atoms with an alkyl group containing up to 6 carbon atoms. The carboxy group may be esterified with alcohols, amino alcohols, alkyl-amino alcohols, dialkyl-amino alcohols with two equal or different alkyl residues of any number of carbon atoms, or with cyclo aliphatic residues such as the cyclohexyl group or cyclohexenyl group. Furthermore, N-alkyl-piperidine residue may be also used for the esterification.

The compounds of our invention may be represented by the following general formula:

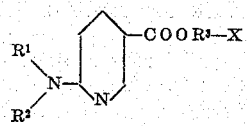

in which $R^1$ and $R^2$ represent hydrogen atoms or the same or different unsubstituted alkyl radicals, $R^3$ represents an unsubstituted alkyl radical, these alkyl radicals being selected from a group of monovalent radicals derived from a saturated hydrocarbon, and X represents a member of the group consisting of amino compounds, alkyl-amino compounds, dialkylamino or cyclic alkyl-amino compounds.

$R^1$ and $R^2$ in the general formula are unsubstituted saturated alkyl residues, such as methyl- to hexyl- residues. They may be the normal or isomeric alkyl groups and contain not more than six carbon atoms each. Those with 3 to 5 carbon atoms appear to be the most effective.

$R^2$ in the general formula represents the residue of a normal or isomeric unsubstituted, saturated alkyl group. Two or three carbon atoms appear to be the most desirable, though higher alkyl groups may be used in some instances.

The most satisfactory results are obtained when at least one hydrogen atom in the amino group X is substituted with an alkyl group. These alkyl groups may also be the same or different, but we have found that dialkyl amines with equal substituents are easier to obtain. A particularly strong active substance is obtained by substituting the two hydrogen atoms with an aliphatic residue containing five carbon atoms to form a piperidine ring.

The compounds of our invention are colorless, basic in character and form addition salts with mineral acids and organic acids. The base of the compounds in general is insoluble in water and soluble in most organic solvents. The salts are more or less soluble in water.

We have prepared a number of the salts of these new basic compounds. The hydrochlorides, sulfates, benzoates, cinnamates and phenyl acetates, some of which form difficulty crystallizable substances as will be noted in this specification.

These compounds appear to be diacidic bases, that is they are capable of forming addition salts with one or two molecules of acids, and we have prepared the mono- and the disalts of many of them.

In general they have high anesthetic properties and their toxicity is comparatively low.

We give the following as examples of the production of a number of compounds included within our invention:

*Example 1*

Dry hydrochloric gas is passed into 20 cc. absolute ethanol in an ice bath until about 1.0 gram is absorbed. Then 0.5 g. finely pulverized 6-ethyl-aminonicotinic acid is added. The mixture is refluxed on the steam bath for two and a half hours, excluding the moisture from the condenser with a drying tube, or until the entire amount of the powder has gone into solution. About 15 cc. of the alcohol is evaporated, 20 cc. water added to the residue and made alkaline with dry sodium carbonate. The new substance precipitated as a crystalline powder is collected, dried and recrystallized from petrol ether.

The chemical reaction of the process is the following:

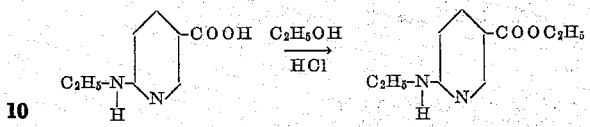

The resulting ethyl-6-ethylamino nicotinate forms rectangular plates from petrol ether. M. P. 66-69° C. It is soluble in alcohols, ether and insoluble in alkalies. It forms addition salts with inorganic and organic acids, which are more or less soluble in water.

The hydrochloride of ethyl-6-ethylamino nicotinate is very soluble in water. Recrystallized from ethylacetate, it forms glistening leaflets. M. P. 191-192° C. On analysis there was found for N=12.37%; theoretical N=12.15%.

*Example 2*

Dry hydrochloric gas is passed into 30 cc. absolute ethanol and cooled in an ice bath until about 1.5 g. are absorbed. Then 1 gram finely pulverized 6-butylamino-nicotinic acid is added, which dissolves easily in the liquid. After standing over night, the solution is refluxed on the steam bath for two hours, excluding the moisture from the condenser with a drying tube. About 20 cc. of the ethanol is then distilled off, 50 cc. water added and the solution made alkaline with powdered sodium carbonate. The new substance precipitated as a white crystalline powder, while the unchanged 6-butyl-amino-nicotinic acid remains in solution. The precipitate is collected, dried and recrystallized from petrol ether.

The chemical reaction of the process is the following:

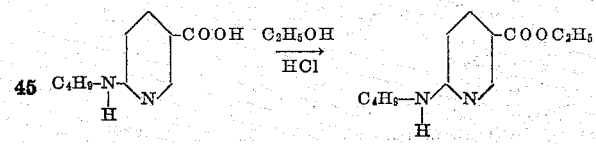

The resulting ethyl-6-butylamino nicotinate forms flat rectangular colorless prisms. M. P. 77-78° C. It is soluble in ether, alcohol and petrol ether. It forms addition salts with inorganic and organic acid, which are more or less soluble in water. Analytical data confirm the above formula. In a nitrogen analysis (micro-Dumas) there was found N=12.81%; theoretical N=12.61%.

The hydrochloride of ethyl-6-butylamino nicotinate forms plate-like prisms when recrystallized from ethylacetate. M. P. 166-167° C. It is soluble in water, very soluble in alcohol, and slightly soluble in cold ethylacetate.

*Example 3*

6.25 grams 6-chloronicotinic acid (6-chloro-3-carboxypyridine) are placed into a glass pressure tube of approximately ¾ inch diameter and 24 inches long and 15.2 ccms. n-butylamine added. Most of the acid dissolves immediately, the rest dissolves by heating on the steam bath below boiling point of the butylamine. Then after cooling the tube the end is sealed in the usual way. The sealed tube is placed into a Carius oven and heated to 170-180° C. and this temperature is retained for six hours. The tube is then cooled to room temperature, opened and 30 cc. water are added. The solution is then removed into a beaker and the tube washed three times with water, using 10 cc. each time. The solution is filtered from the slight amount of precipitate and contains the butylammonium salt of butylaminonicotinic acid according to the following equation:

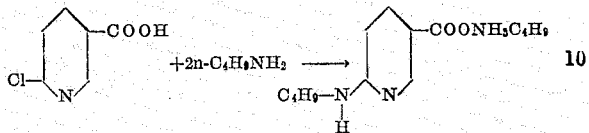

The solution is now carefully neutralized with hydrochloric acid, the precipitate collected on a filter, washed with water and recrystallized from methanol. The recrystallized 6-butylaminonicotinic acid has a melting point of 201° C. Yield 57.6%. This 6-butylaminonicotinic acid is now dissolved by careful addition of a 10% solution of potassium hydroxide, the solution evaporated to dryness, and so obtaining the potassium salt.

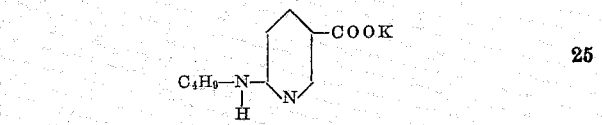

17.75 grams of β-chloroethyl-diethylamine hydrochloride are now dissolved in 25 cc. water, placed into a separatory funnel and 20 cc. sodium hydroxide solution (37%) is added. The separated free amine is now taken up with ether, the solution dried with flake caustic soda, and this solution is poured into 21.25 grams (from several batches) of potassium 6-butylamino-nicotinate placed previously into a round bottom flask. The ether is now evaporated and the residue heated for two hours on the steam bath. The resulting oil after cooling is dissolved in ether and washed with water several times. After evaporation of the ether it solidifies and is purified by recrystallization out of petrol ether.

The chemical reaction of the process is the following:

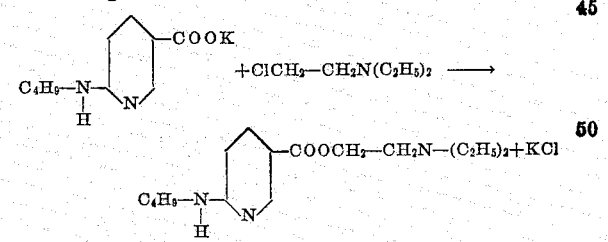

The resulting diethylaminoethyl-6-butylamino nicotinate forms colorless needle clusters. M. P. 31-32° C. It is soluble in ether, alcohol, petrol ether, and insoluble in alkalies.

Analytical data confirm the above formula. In a nitrogen determination (micro-Dumas) there was found N=14.22%, theoretical N=14.33%.

It forms addition salts with inorganic and organic acids, which are more or less soluble in water.

The monohydrochloride of diethylaminoethyl-6-butylaminonicotinate forms colorless clusters, when recrystallized from ethyl acetate, M. P. 118-121° C. The melting point of the dihydrochloride is 198-201° C. The benzoate, cinnamate and phenyl acetate of this compound form difficulty crystallizable oils.

The monohydrochloride of dimethylaminoethyl-6-propylamino nicotinate forms white flat needles. M. P. 112-114° C.

Diethylaminoethyl-6-propylamino nicotinate,

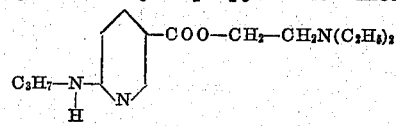

was prepared in a similar way. It forms a difficultly crystallizable oil. The dihydrochloride recrystallized from a mixture of amyl acetate and amyl alcohol and melts at 170–172° C.

We also prepared the diethylaminoethyl-6-(n)-amylamino nicotinate and the diethylaminoethyl-6-(iso)amyl nicotinate. The free bases and the hydrochlorides of these compounds form difficultly crystallizable oils.

Diethylamino - isopropyl - 6 - butylamino nicotinate:

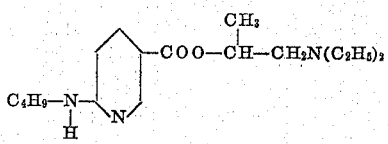

was prepared in a similar way. The free base, hydrochlorides, and sulphate of this compound form difficultly crystallizable oils.

*Example 4*

0.74 gram 6-diethylamino nicotinic acid (6-diethylamino-3-carboxypyridine) are dissolved in 38.1 cc. N/10 sodium hydroxide, evaporated to dryness and the resulting sodium salt pulverized. 0.8 gram β-chloroethyl-diethylamine are now dissolved in 10 cc. water, placed into a separatory funnel and made alkaline with sodium hydroxide solution. The separated free amine is taken up with ether, dried with flake caustic soda, and the solution added to the sodium 6-diethylamino nicotinate. The mixture is treated as described in the previous example. The hydrochloride of the compound is recrystallized from acetone M. P. 118–121° C., and has the following formula:

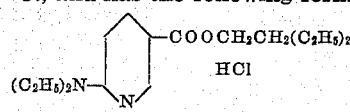

It is soluble in water, alcohols and acetone.

*Example 5*

2 gms. N-(β-chlorethyl) piperidine hydrochloride are dissolved in 12 cc. water, and the solution is made strongly alkaline with potassium hydrate solution. The free base is extracted with ether and to this extract 2 gms. finely pulverized potassium salt of 6-butylaminonicotinic acid are added. The ether is evaporated and the residue is heated on the steam bath for about 2 hours, with occasional stirring. After cooling 20 cc. water are added, to dissolve the formed potassium chloride, and the free base of the new compound is shaken out with ether. After evaporating the ether a viscous amber colored oil is obtained.

The chemical reaction in preparing this compound is the following:

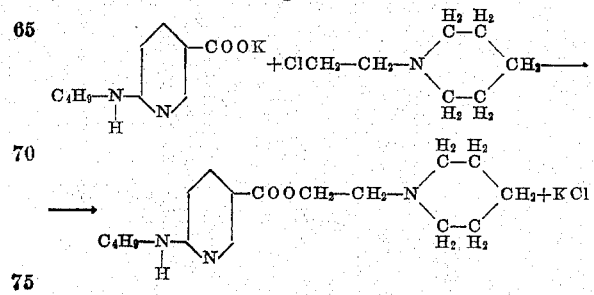

The new compound N-ethyl piperidine-6-butylamino nicotinate forms a low melting solid, soluble in alcohol, ether, acetone, and insoluble in water.

The monohydrochloride of the compound crystallizes out of ethyl acetate in colorless clusters. M. P. 167–169° C. It is very soluble in water, alcohol and acetone. Nitrogen determination of this compound verifies the above formula. There was found N=12.32%, theoretical N=12.29%. The benzoate forms a difficultly crystallizable oil, which is very soluble in water, alcohol, ether, acetone, benzene, but insoluble in ligroine.

The compounds prepared according to the methods described in the example have anesthetic properties. When a small quantity is placed on the tongue, one will promptly observe a lasting anesthetic action. For testing purposes the hydrochloride and other salts of the compounds were prepared and 0.5–2% solutions were used. Rabbits' eyes were flooded with the solution for 1 minute. The anesthesia in some cases lasted over an hour. The toxicity tests prove that they are relatively non-toxic.

These new anesthetics can be used in aqueous solutions by dissolving their salts, the monohydrochlorides, dihydrochlorides and benzoates having preference over the other salts. The bases dissolved in oil of sweet almond or other suitable oils can be used for injections or can be incorporated into ointments.

By slight changing of the alkyl radicals many apparently widely different embodiment of this invention may be made without departing from the spirit thereof.

We do not limit ourselves to the specifically mentioned times, temperatures, quantities, chemicals, or steps of procedure as these are given simply to clearly describe our invention as set forth in our specification and claims, and they may be varied without going beyond the scope of our invention.

What we claim is:

1. As a medicinal compound having anaesthetic properties, the ester of an aminopyridine carboxylic acid having the formula:

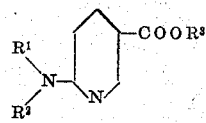

in which $R^1$ represents an alkyl group having not more than 6 carbon atoms, $R^2$ represents hydrogen or the same or different alkyl groups as that of $R^1$ having not more than 6 carbon atoms, and $R^3$ represents an alkyl group, these alkyl groups being unsubstituted and selected from a group of monovalent radicals derived from a saturated hydrocarbon.

2. As a medicinal compound having anaesthetic properties, the ester of an aminopyridine carboxylic acid having the formula

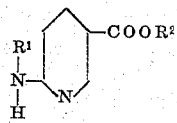

in which $R^1$ represents an alkyl group having not more than 6 carbon atoms and $R^2$ represents an alkyl group, these alkyl groups being unsubstituted and selected from a group of monovalent radicals derived from a saturated hydrocarbon.

3. As a medicinal compound having anaesthetic properties, the ester of an aminopyridine carboxylic acid having the formula:

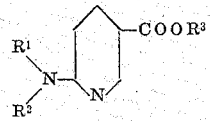

in which $R^1$ and $R^2$ represent the same or different alkyl groups each having not more than 6 carbon atoms and $R^3$ represents an alkyl group, these alkyl groups being unsubstituted and selected from a group of monovalent radicals derived from a saturated hydrocarbon.

4. As a medicinal compound having anaesthetic properties, the ester of an aminopyridine carboxylic acid having the formula:

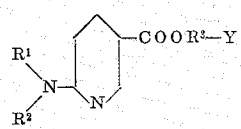

in which $R^1$ and $R^2$ represent the same or different alkyl groups, each having not more than 6 carbon atoms, $R^3$ represents an alkyl group, these alkyl groups being unsubstituted and selected from a group of monovalent radicals derived from a saturated hydrocarbon, and Y represents the residue of a member of the group consisting of alkylamines and cyclic alkylamines.

5. As a medicinal compound having anaesthetic properties, the ester of an aminopyridine carboxylic acid having the formula:

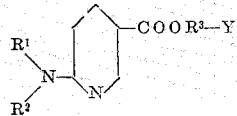

in which $R^1$ represents an alkyl group having not more than 6 carbon atoms, $R^2$ represents hydrogen or an alkyl group having not more than 6 carbon atoms, $R^3$ represents an alkyl group, these alkyl groups being unsubstituted and selected from a group of monovalent radicals derived from a saturated hydrocarbon, and Y represents the residue of a member of the group consisting of alkylamines and cyclic alkylamines.

6. As a medicinal compound having anaesthetic properties, the ester of an aminopyridine carboxylic acid having the formula:

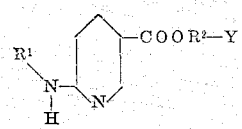

in which $R^1$ represents an alkyl group having not more than 6 carbon atoms, $R^2$ represents an alkyl group having not more than 6 carbon atoms, these alkyl groups being unsubstituted and selected from a group of monovalent radicals derived from a saturated hydrocarbon, and Y represents the residue of one of the members of the group consisting of alkylamines and cyclic alkylamines.

7. As a medicinal compound having anaesthetic properties, the ester of an aminopyridine carboxylic acid having the formula:

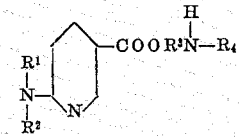

in which $R^1$ represents an alkyl group having not more than 6 carbon atoms, $R^2$ represents hydrogen or an alkyl group having no more than 6 carbon atoms, and $R^3$ and $R^4$ represents the same or different alkyl groups, these alkyl groups being unsubstituted and selected from a group of monovalent radicals derived from a saturated hydrocarbon.

8. As a medicinal compound having anaesthetic properties, the ester of an aminopyridine carboxylic acid having the formula:

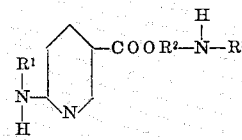

in which $R^1$, $R^2$, and $R^3$ represent the same or different alkyl groups having not more than 6 carbon atoms, and these alkyl groups being unsubstituted and selected from a group of monovalent radicals derived from a saturated hydrocarbon.

9. As a medicinal compound having anaesthetic properties, the ester of an aminopyridine carboxylic acid having the formula:

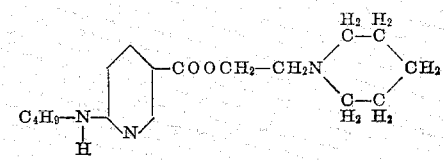

10. As a medicinal compound having anaesthetic properties, the ester of an aminopyridine carboxylic acid having the formula:

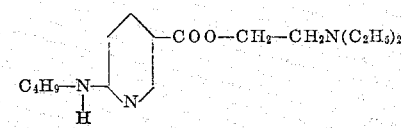

11. As a medicinal compound, a water soluble salt of the compound of claim 1.

12. As a medicinal compound, a water soluble salt of the compound of claim 2.

13. As a medicinal compound, a water soluble salt of the compound of claim 3.

14. As a medicinal compound, a water soluble salt of the compound of claim 4.

15. As a medicinal compound, a water soluble salt of the compound of claim 5.

16. As a medicinal compound, a water soluble salt of the compound of claim 6.

17. As a medicinal compound, a water soluble salt of the compound of claim 7.

18. As a medicinal compound, a water soluble salt of the compound of claim 8.

19. As a medicinal compound, a water soluble salt of the compound of claim 9.

20. As a medicinal compound, a water soluble salt of the compound of claim 10.

RAEMER R. RENSHAW.
PAUL F. DREISBACH.